United States Patent
Celebioglu et al.

(10) Patent No.: US 12,405,828 B2
(45) Date of Patent: Sep. 2, 2025

(54) CONSENSUS-BASED DISTRIBUTED SCHEDULER

(71) Applicant: Dell Products L.P., Round Rock, TX (US)

(72) Inventors: Onur Celebioglu, Austin, TX (US); John A. Lockman, III, Granite Shoals, TX (US); Lucas A. Wilson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 540 days.

(21) Appl. No.: 17/575,387

(22) Filed: Jan. 13, 2022

(65) Prior Publication Data
US 2023/0221996 A1 Jul. 13, 2023

(51) Int. Cl.
G06F 9/50 (2006.01)
G06F 9/48 (2006.01)
G06F 11/34 (2006.01)

(52) U.S. Cl.
CPC .......... *G06F 9/5038* (2013.01); *G06F 9/5044* (2013.01); *G06F 9/5083* (2013.01); *G06F 11/3433* (2013.01); *G06F 11/3466* (2013.01)

(58) Field of Classification Search
CPC .... G06F 9/5038; G06F 9/4881; G06F 9/5044; G06F 9/5083; G06F 11/3433;
(Continued)

(56) References Cited

U.S. PATENT DOCUMENTS

2006/0168011 A1* 7/2006 Lamport ............. H04L 67/1095
709/206
2007/0214355 A1* 9/2007 Lamport ............... G06F 11/182
713/156

(Continued)

OTHER PUBLICATIONS

Gkikopoulos, Panagiotis & Schiavoni, Valerio & Spillner, Josef. (Jun. 9, 2021). Analysis and Improvement of Heterogeneous Hardware Support in Docker Images. In: Matos M., Greve F. (eds) Distributed Applications and Interoperable Systems. DAIS 2021. Lecture Notes in Computer Science, vol. 12718. Springer, Cham. https://doi.org/10.1007/978-3-030-78198-9_9 total pages: 19.

(Continued)

*Primary Examiner* — Mustafa A Amin
(74) *Attorney, Agent, or Firm* — WOMBLE BOND DICKINSON (US) LLP

(57) ABSTRACT

Methods and systems for managing workload performance in distributed systems is disclosed. The distributed system may include any number of data processing systems that may perform workloads. To manage workload performance, the distributed system may include a distributed control plane. The distributed control plane may include any number of data processing systems that both receive and service workload requests. When a workload request is received by one of the data processing systems of the control plane, a consensus based processing for a selecting one of the data processing systems to perform the workload may be performed. Consequently, the data processing system that received the workload request may or may not perform the workload to service the workload request depending on the outcome of the consensus based process.

20 Claims, 12 Drawing Sheets

(58) Field of Classification Search
CPC .... G06F 9/505; G06F 9/5055; G06F 11/3466; H04L 67/1029
See application file for complete search history.

(56) References Cited

U.S. PATENT DOCUMENTS

| | | | | |
|---|---|---|---|---|
| 2011/0161964 | A1* | 6/2011 | Piazza | G06F 9/4881 |
| | | | | 718/102 |
| 2012/0254342 | A1* | 10/2012 | Evans | G06F 11/2064 |
| | | | | 709/214 |
| 2013/0290957 | A1* | 10/2013 | Li | G06F 9/5066 |
| | | | | 718/1 |
| 2015/0324182 | A1* | 11/2015 | Barros | G06F 9/455 |
| | | | | 717/174 |
| 2018/0276251 | A1* | 9/2018 | Srinivasan | G06F 16/27 |
| 2021/0201290 | A1* | 7/2021 | Wardman | H04W 12/104 |
| 2022/0261278 | A1* | 8/2022 | Perneti | G06F 9/5027 |
| 2022/0405131 | A1* | 12/2022 | Yao | G06F 9/485 |

OTHER PUBLICATIONS

"Getting Started with Docker," Web page <https://www.docker.com/get-started>, 1 page, Dec. 31, 2021, retrieved from Internet Archive Wayback Machine <http://web.archive.org/web/20211231094517/https://www.docker.com/get-started> on Jan. 20, 2022.

* cited by examiner

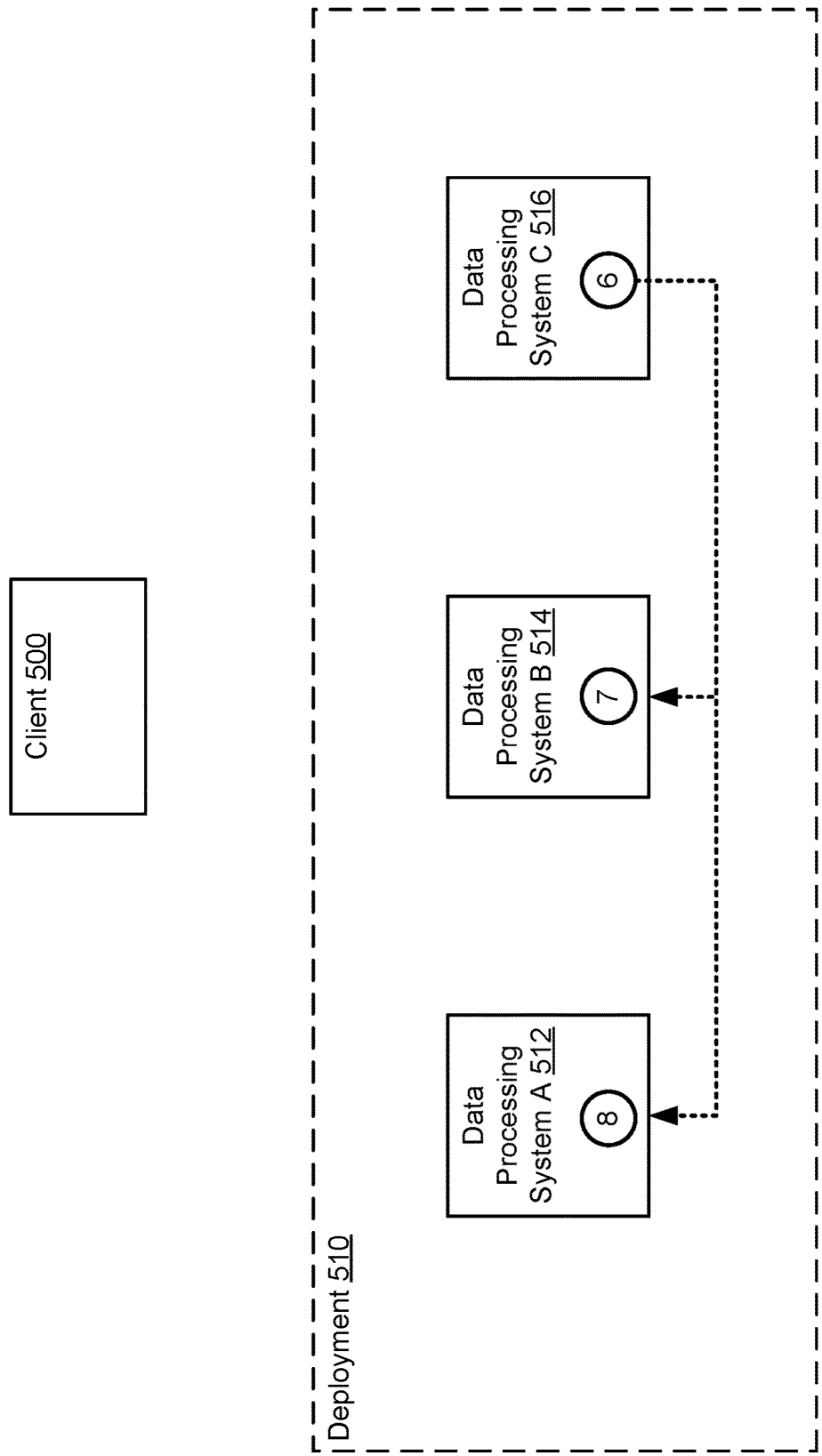

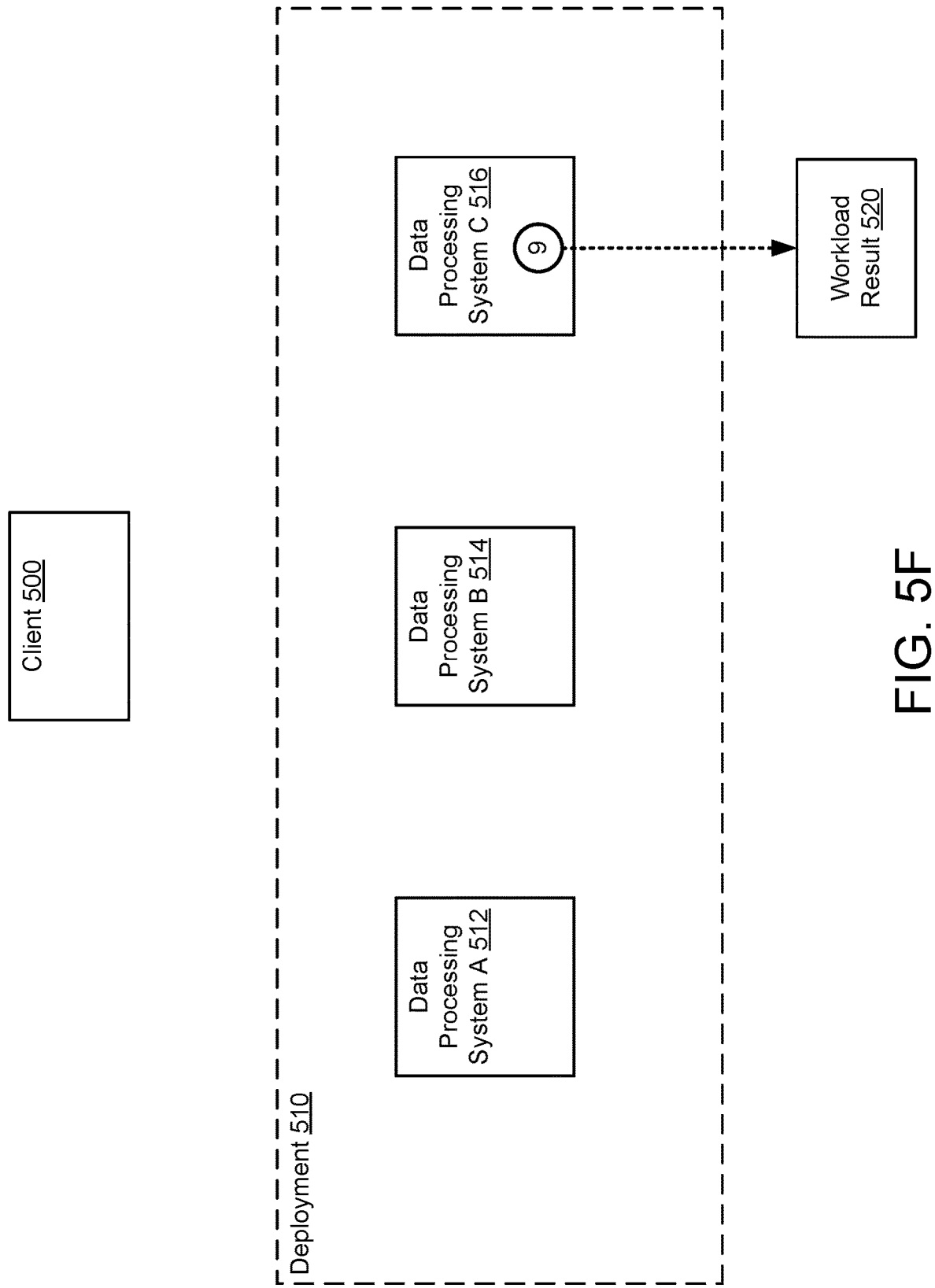

CONSENSUS-BASED DISTRIBUTED SCHEDULER

FIELD OF THE DISCLOSED EMBODIMENTS

Embodiments disclosed herein relate generally to distributed management. More particularly, embodiments disclosed herein relate to systems and methods for managing workload scheduling in distributed systems.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments disclosed herein are illustrated by way of example and not limitation in the figures of the accompanying drawings in which like references indicate similar elements.

FIGS. 5A-5F show diagrams illustrating example operations performed by an example system over time in accordance with an embodiment.

DETAILED DESCRIPTION

Figure 1A:
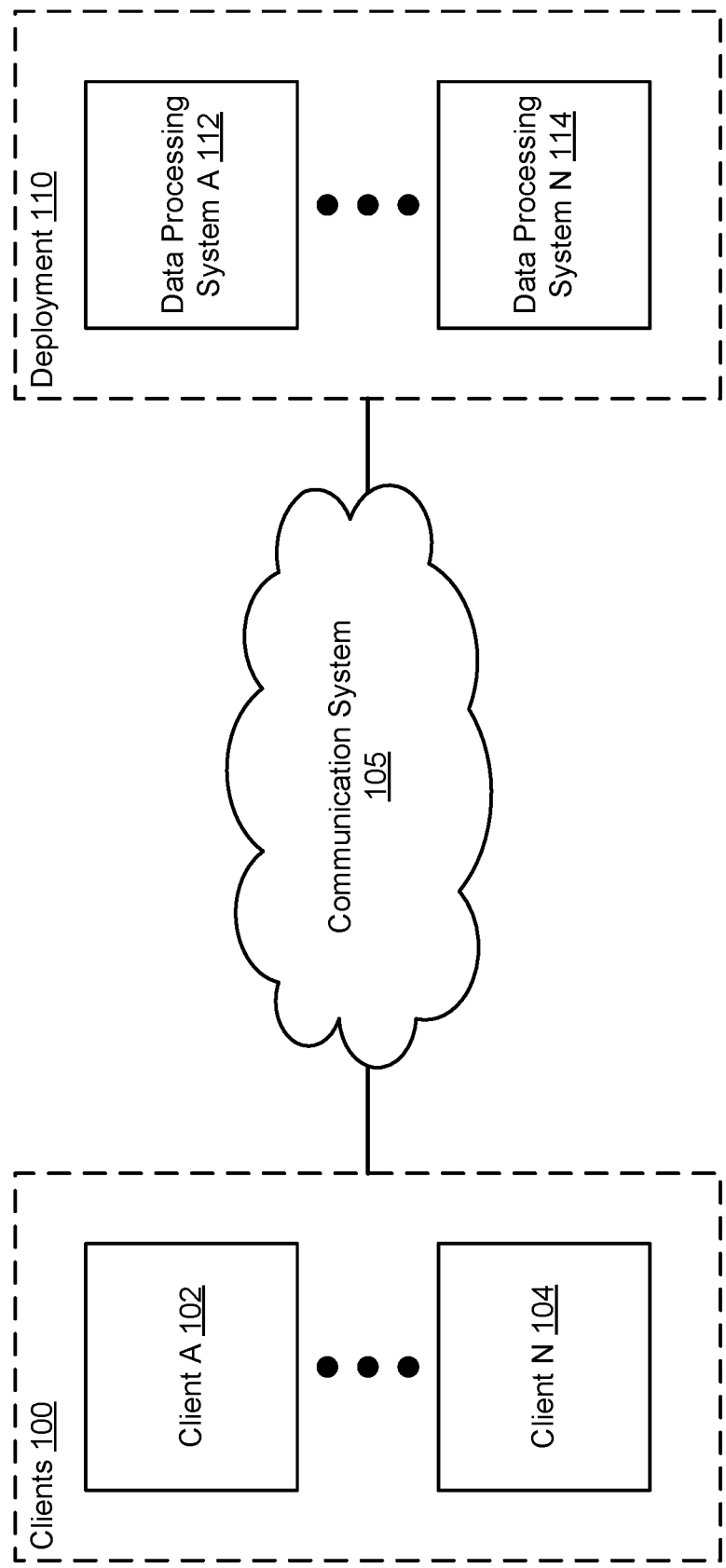
FIG. 1A shows a block diagram illustrating a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing workload performance in a distributed system. The distributed system may include any number of data processing systems (e.g., also referred to as resource data processing systems) that may perform workloads. To manage workload performance, the distributed system may include a distributed control plane.

The distributed control plane may include any number of data processing systems that both receive and service workload requests. When a workload request is received by one of the data processing systems of the control plane, a consensus based processing for a selecting one of the data processing systems to perform the workload may be performed. Consequently, the data processing system that received the workload request may or may not perform the workload to service the workload request depending on the outcome of the consensus based process.

The consensus based process of selecting data processing systems to perform workload may be tolerant of unavailability of some of the data processing systems. For example, the consensus process may not require participation by all of the data processing systems. Thus, if a data processing system becomes unavailable (e.g., during the process) it may not hinder the process of placing a workload.

By doing so, embodiments disclosed herein may improve the resiliency of distributed systems to unavailability of portions of the distributed system. By scheduling performance of workloads using a consensus based process, workloads may continue to be placed and serviced as various portions of the distributing system transition between available and unavailable.

In an embodiment, a computer-implemented method for servicing workload requests using a distributed system comprising data processing systems is disclosed. The method may include obtaining, by a first data processing system of the data processing systems, a workload request for a workload; distributing, by the first data processing system, workload request information to at least a portion of the data processing systems, the workload request information being based on the workload request; initiating, by the first data processing system, a consensus based scheduling process that uses the workload request information to select one of the data processing systems to service the workload request; and servicing, by the first data processing system, the workload request with the selected one of the data processing systems, the selected one of the data processing systems schedules future performance of the workload by the one of the data processing systems.

The consensus based scheduling process may include generating, by the first data processing system, a proposal regarding servicing of the workload request; distributing, by the first data processing system, the proposal to the at least the portion of the data processing systems; and receiving, by the first data processing system, feedback regarding the proposal from the at least the portion of the data processing systems, the feedback indicating whether the proposal is agreed to or denied by the data processing systems.

The proposal may indicate a performance time for the workload, and the feedback may include a message from one or more of the portion of the data processing systems accepting the proposal, and/or no response from one or more of the portion of the data processing systems, the no response indicating that the proposal is denied by respective one or more of the portion of the data processing systems.

The computer-implemented method may also include performing, by the one of the data processing systems, the workload based on the scheduled future performance.

Each of the data processing systems may operate as workload request servicing end points and workload request servicers (e.g., by performing workloads).

The portion of the data processing systems may include a majority of the data processing systems.

The one of the data processing systems may be selected when the majority of the data processing systems each indicate that the one of the data processing systems is capable of servicing the workload request more quickly than the other data processing systems.

The data processing systems may be leaderless. Thus, the data processing systems may not be subject to leader-based failure modes for workload placement.

The data processing systems may be distributed geographically from one another and with corresponding clients that may submit the workload requests. A cardinality of the data processing systems may be dynamically adjusted based on changes in a cardinality of the clients.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to, one or more clients 100, deployments 110, and a communication system 105 that facilitates operable connections between all, or a portion, of the components illustrated in FIG. 1. Each of these components is discussed below.

All, or a portion, of clients 102-104 may provide services to users of clients 100 and/or to other devices operably connected to clients 100. To provide services (e.g., computer implemented services) to users or other devices, clients 100 may utilize services provided by deployment 110. Deployment 110 may provide any type and quantity of computer implemented services to service workload requests. The computer implemented services provided by deployment 110 may be specified by clients 100 and/or other entities.

Clients 100 and deployment 110 may provide any type and quantity of computer implemented services. The computer implemented services may include, for example, database services, instant messaging services, video conferencing services, data storage services, and/or other types of computer implemented services.

To provide the computer implemented services to client 100, deployment 110 may include any number of data processing systems 112-114. The data processing systems may each provide respective computer implemented services to service workloads.

To initiate performance of a workload, a client may send a request to one of data processing systems 112-114. Clients may send workload requests to any of data processing systems 112-114.

However, each of data processing systems 112-114 may have a limited quantity of computing resources (e.g., processors, memory modules, storage devices, etc.). Consequently, each data processing system may have a limited ability to service workloads. If a data processing system is unable to perform a workload, the performance may be delayed which may be undesirable for clients 100.

In general, embodiments disclosed herein relate to systems, methods, and devices for managing performance of workloads in distributed system. The performance of the workloads may be managed using a distributed, consensus driven control plane. The control plane may extend across all of the data processing systems that may perform workloads.

When a workload request is received, the control plane may select one of the data processing systems to perform the workload (which may be different from the data processing system that received the request to perform the workload). The control plane may perform a consensus driven process for selecting the workload that is independent of the availability status of any of the data processing systems. By being independent of the availability (e.g., reachability which may be impacted by, for example, unreachability, inoperability, and/or other factors) of the data processing systems, the workloads may continue to be serviced while the availability status of the data processing systems dynamically changes over time. In other words, the control plane may not include any single points of failure (e.g., leaders, hierarchies) that may result in failure of the workload management process performed to ensure that workloads are serviced.

For example, consider a scenario where some of data processing systems 112-114 are hosted by automobiles while others operate as part of edge computing deployments. As the automobiles move, network connectivity between the data processing systems may be lost and regained, depending on the path that each of the automobiles take as they traverse the world. The distributed control plane may automatically respond to changes in connectivity to ensure that workloads continue to be appropriately distributed for processing. In contrast, a data processing system of a hierarchical distributed system that manages workload distribution to other data processing systems of the hierarchical system may fail (e.g., result in suspension of workload processing) when the data processing system loses connectivity to the other data processing systems.

Figure 1B:
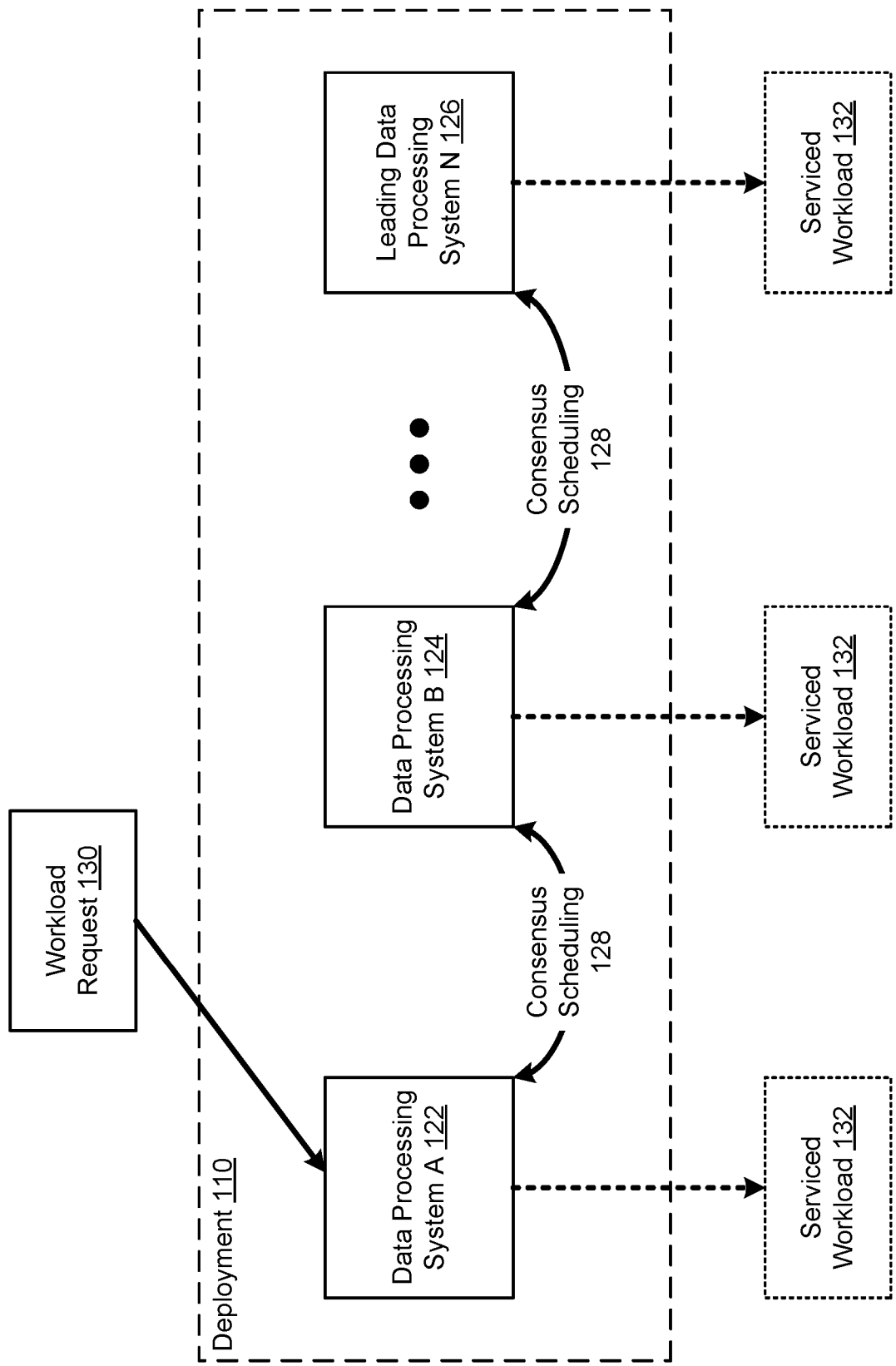
FIG. 1B shows a block diagram illustrating a deployment in accordance with an embodiment.

Refer to FIG. 1B for additional details regarding the control plane and workload consensus driven workload placement.

By providing the above noted functionality, a system in accordance with embodiments disclosed herein may be more likely to provide desired computer implemented services over time even as various data processing systems of a deployment (e.g., 110) transition between being unavailable and available (e.g., reachable, operable, etc.). Consequently, the disclosed system may have improved resilience to challenging environments which may other result in suspension of, termination of, and/or other undesired workload processing.

Any of clients 100 and deployment 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), or any other type of data processing system or system. For additional details regarding computing devices, refer to FIG. 6. For additional details regarding data processing systems 112-114, refer to FIG. 2.

In an embodiment, communication system 105 includes one or more networks that facilitate communication between all, or a portion, of clients 100 and deployments 110. To provide its functionality, communication system 105 may be implemented with one or more wired and/or wireless networks. Any of these networks may be private, public, and/or may include the Internet. For example, clients 100 may be operably connected to one another via a local network which is operably connected to the Internet. Similarly, deployments 110 may be operably connected to one another via a second local network which is also operably connected to the Internet thereby allowing any of clients 100 and deployments 110 to communication with one another and/or other devices operably connected to the Internet. Clients 100, deployments 110, and/or communication system 105 may be adapted to perform one or more protocols for communicating via communication system 105.

While illustrated in FIG. 1A as including a limited number of specific components, a system in accordance with an embodiment may include fewer, additional, and/or different components than those illustrated therein.

As discussed above, deployment 110 may include a control plane that manages workload processing through consensus driven placement. FIG. 1B shows a diagram of deployment 110 in accordance with an embodiment disclosed herein. As noted above, deployment 110 may include a control plane formed using data processing systems 122, 124, 126 that may also perform the workloads managed by the control plane.

Generally, data processing systems A-N 122-126 may cooperatively place workloads with various data processing systems for performance. Any of data processing systems A-N 122-126 may receive workload requests. When an example workload request 130 is received by a data processing system, consensus scheduling 128 may be performed to select one of the data processing systems to perform the workload. Consensus scheduling 128 may include (i) distributing the workload request to a majority of the data processing systems, (ii) obtaining proposals for servicing the workload request 130 from one or more of the majority of the data processing systems, (iii) selecting one of the data processing systems based on the proposals, and (iv) placing the workload with the one of the data processing systems to service workload request 130.

Consequently, when a workload request 130 is received, any of data processing systems 122-126 may end up servicing the workload to obtain the serviced workload 132 to service the workload request 130.

Each of the data processing systems may generate proposals based on their own individual circumstances. For example, data processing systems that already have heavy workloads may generate proposals for performing the workload to service workload request 130 at points in time in the distant future. In contrast, data processing systems that have light workloads may generate proposals for performing the workload to service workload request 130 at point in time in the near future. In an embodiment, the proposal indicating the nearest point in time in the future may be selected as the winning proposal, and the data processing system that submitted the winning proposal may be selected to perform the workload to service workload request 130.

The number (e.g., a cardinality) of data processing systems 122-126 may dynamically change based on one or more of: (i) a number of clients submitting workload requests, (ii) rates at which workload requests are being received, (iii) the aggregate estimated computing resources for servicing workload requests, and/or (iv) other factors. For example, the number of data processing systems 122-126 may be increased as the quantity of clients increases, and the number of data processing systems 122-126 may be decreased as the rate at which workload requests are being received decreases.

Each of the data processing systems may operate as a workload request servicing end point and a workload request servicer. The data processing systems may be geographically distributed from one another and with corresponding clients that may submit the workload requests. For example, the clients may be geographically distributed in groups. A data processing systems may be positioned with each group of clients thereby placing a workload request servicing end point near (e.g., from a geographic and communications standpoint) all of the clients.

While illustrated in FIG. 1B with a limited number of specific components, a deployment may include additional, fewer, and/or different components without departing from embodiments disclosed herein.

Figure 2:
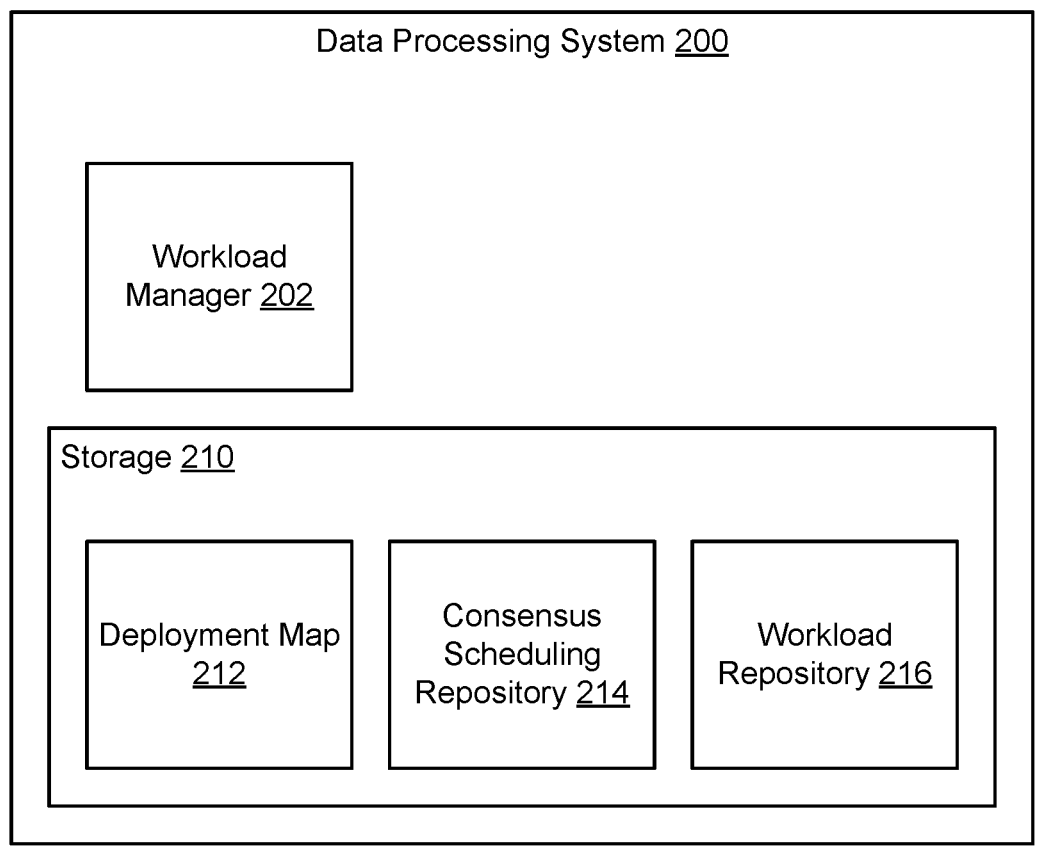
FIG. 2 shows a block diagram illustrating a data processing system in accordance with an embodiment.

Turning to FIG. 2, a diagram of an example data processing system 200 in accordance with an embodiment is shown. Data processing system 200 may be similar to any of data processing systems 112-114, 122-126 shown in FIGS. 1A-1B. As discussed above, data processing system 200 may be used to service workload requests using a consensus driven control plane that manages workload placement. To provide the aforementioned functionality, data processing system 200 may include workload manager 202 and storage 210. Each of these components is discussed below.

Workload manager 202 may provide workload placement services. Workload placement services may include (i) receiving workload requests from clients, (ii) distributing the workload requests to other data processing systems of a control plane for a deployment, (iii) using a consensus driven process to collaborate select a data processing system of the deployment to service the workload request, and (iv) initiating workload performance by the selected data processing system to service the workload request. When selecting the data processing system, workload manager 202 may evaluate the current state (e.g., load state) of data processing system 200, estimate when data processing system 200 may be able to service the workload based on its load state, and propose to other data processing systems that data processing system service the workload at the estimated point in time. Workload manager 202 may evaluate its proposal and proposals from other data processing systems to select the data processing system (e.g., that proposed to perform the workload the soonest) to perform the workload to service the workload request.

To generate proposals, workload manager 202 may store information regarding currently being and scheduled workloads in workload repository 216. Workload manager 202 may distribute the generated proposals (and/or workload requests from client) to other data processing systems using deployment map 212. For example, workload manager 202 may multicast the information to all, or a portion, of the members of the control plane. Workload manager 202 may store proposals from other data processing systems in consensus scheduling repository 214 thereby facilitate efficient comparison to other proposals.

Figure 3:
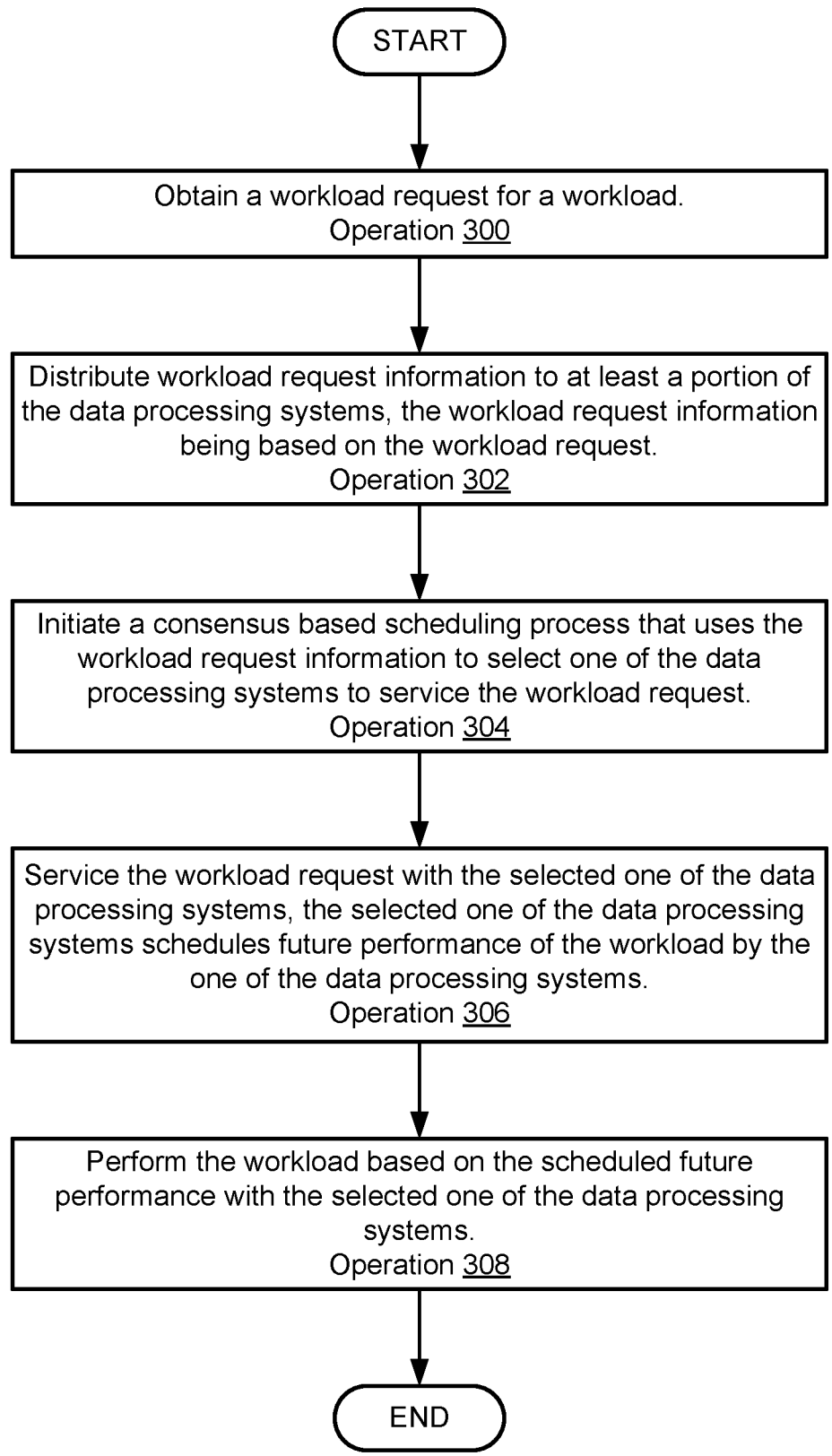
FIG. 3 shows a flow diagram illustrating a method of servicing workload requests in accordance with an embodiment.
Figure 4:
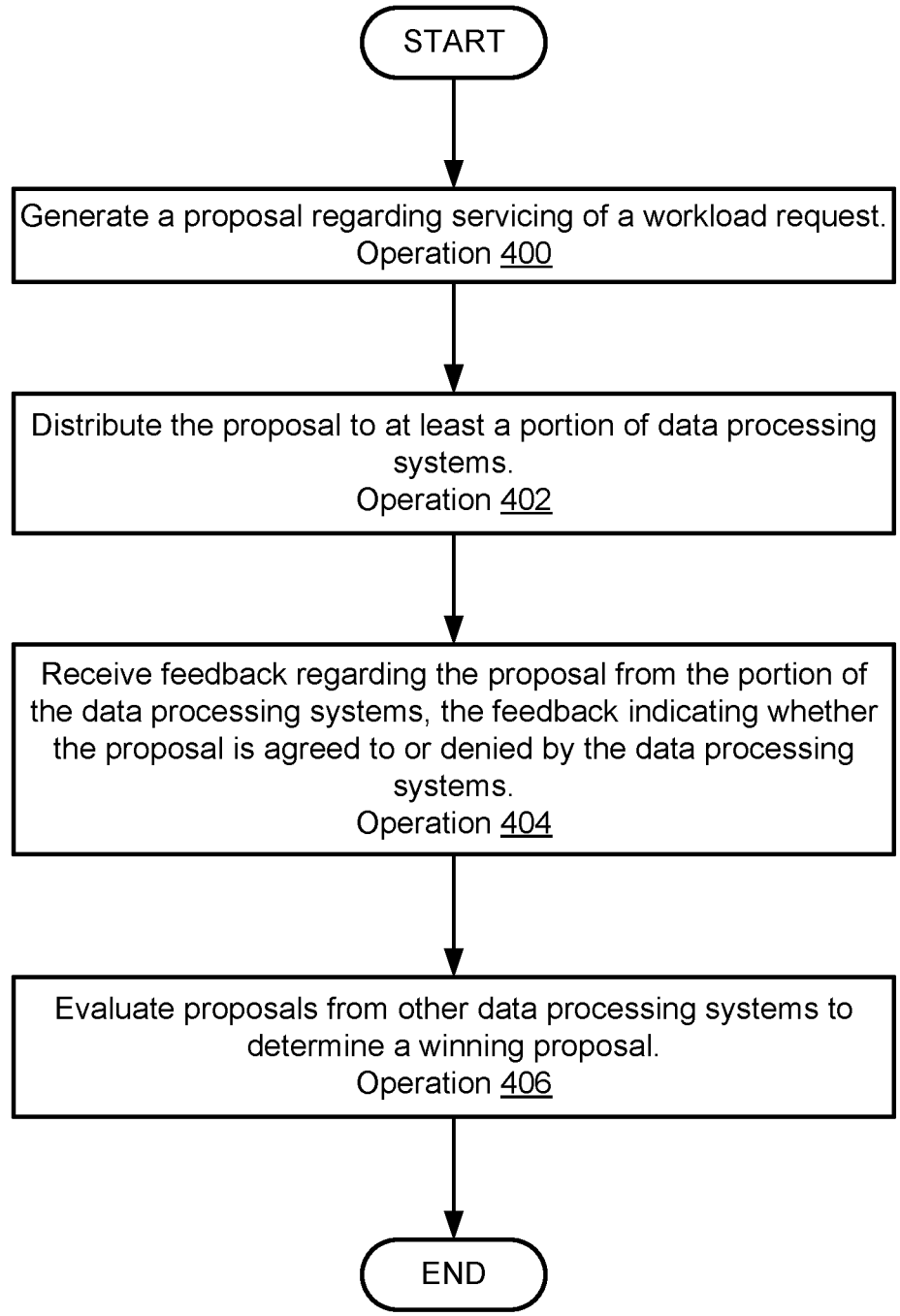
FIG. 4 is a flow diagram illustrating a method of selecting a data processing system to service a workload in accordance with an embodiment.

When providing its functionality, workload manager 202 may perform all, or a portion, of the methods illustrated in FIGS. 3-4 and/or the operations and actions illustrated in FIGS. 5A-5F.

In an embodiment, workload manager 202 is implemented using a hardware device including circuitry. The hardware device may be, for example, a digital signal processor, a field programmable gate array, or an application specific integrated circuit. The circuitry may be adapted to cause the hardware device to perform the functionality of workload manager 202. Workload manager 202 may be implemented using other types of hardware devices without departing from embodiments disclosed herein.

In an embodiment, workload manager 202 is implemented using a processor adapted to execute computing code stored on a persistent storage that when executed by the processor performs the functionality of workload manager 202 discussed throughout this application. The processor may be a hardware processor including circuitry such as, for example, a central processing unit or a microcontroller. The processor may be other types of hardware devices for processing digital information without departing from embodiments disclosed herein.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including deployment map 212, consensus scheduling repository 214, and/or workload repository 216. Each of these data structures is discussed below.

Deployment map 212 may include one or more data structures that include information regarding data processing systems of a control plane of a deployment. The information may include, for example, identifiers of the data processing systems, communication information usable to communicate with the data processing systems (e.g., such as associated network endpoint, multicast addresses, etc.), availability statuses, and/or other information usable to facilitate consensus based management of workload deployment.

Consensus scheduling repository 214 may include one or more data structures that include information usable to manage consensuses management. For example, Consensus scheduling repository 214 may copies of proposals from other data processing systems regarding workload placement, proposals generated by workload manager 202, identifiers of workload requests to be serviced, and/or other types of information usable to select data processing systems to service corresponding workload requests.

Workload repository 216 may include one or more data structures that include information regarding workload being and/or scheduled to be performed by data processing system. The information may include (i) identifiers of workloads, (ii) computing resource use measurements and/or estimates for performing the workloads, (iii) expected periods of time during which workloads will be performed, (iv) available and/or total computing resources of data processing system 200, (v) estimates of computing resource availability for data processing systems 200 over time in the future, and/or (vi) other information usable to estimate when data processing system 200 would likely be able to service workload requests. For example, the information in workload repository 216 may be usable to forecast future computing resource use and availability, estimate computing resources that will be required to service workload requests, etc.

While various data structures have been illustrated and described in FIG. 2 with specific structures, any of the data structures may be implemented with various types of structures (e.g., lists, tables, linked lists, databases, etc.), stored in different locations, may include different/less/more information than described above, and/or spanned across any number of devices without departing from embodiments disclosed herein.

While illustrated in FIG. 2 with a limited number of specific components, a client may include additional, fewer, and/or different components without departing from embodiments disclosed herein.

As discussed above, the components of FIG. 1A may perform various methods to manage a deployment. FIGS. 3-4 illustrates examples of methods that may be performed by the components of FIG. 1A. In the diagrams discussed below and shown in FIGS. 3-4, any of the operations may be repeated, performed in different orders, and/or performed in parallel with or a partially overlapping in time manner with other operations.

Turning to FIG. 3, a flow diagram illustrating a method of servicing a workload request in accordance with an embodiment is shown. The method may be performed by a data processing system or another entity.

Prior to operation 300, various data processing systems may transition between available and unavailable status due to operable connectivity changes, errors in operation, and/or other factors.

At operation 300, a workload request for a workload is obtained. The workload requests may be obtained from a client or other entity. For example, the workload requests may be obtained via one or more messages. The workload request may request performing of the workload.

At operation 302, workload request information is distributed to at least a portion of the data processing systems of a deployment. The workload request information may be based on the workload request. For example, the workload request information may include sufficient information regarding the workload so that the data processing systems are each able to generate estimates of when each could service the workload request.

In an embodiment, the workload request is distributed by multicasting it. For example, the data processing system may use a deployment map to identify network endpoint information and/or a multicast address associated with the data processing systems of the deployment. The information may be used to generate and/or send messages in which the workload request information is stored to the data processing systems.

At operation 304, a consensus based scheduling process that uses the workload request information is initiated to select one of the data processing systems to service the workload request. The consensus based scheduling process may be initiated by generating and sending (e.g., multicasting) a proposal (e.g., for servicing the workload request by the data processing system) to the other data processing systems and/or receiving proposals from the data processing systems.

The consensus based scheduling process may be performed via the method illustrated in FIG. 4, or via other methods without departing from embodiments disclosed herein.

The consensus based scheduling process may result in selection of one of the data processing systems to perform the workload.

In an embodiment, the consensus based scheduling process using one or more of the following algorithms to drive consensus decisions: the paxos consensus algorithm, the chubby consensus algorithm, the raft consensus algorithm, the viewed stamp consensus algorithm, the replicated machine state consensus algorithm (CASPaxos), and/or other types of consensus algorithms. Multiple algorithms may be employed and the results of the algorithms may be statistically analyzed to identify a winner (e.g., most common result being the winner).

At operation 306, the workload request is serviced with the selected one of the data processing systems. The selected data processing system may schedule future performance (e.g., as proposed in the winning proposal) of the workload. Consequently, the selected data processing system may perform the workload in the future. At this point, while not performed, the workload request may be treated by the control plane as already being serviced.

At operation 308, the workload is performed based on the scheduled future performance with the selected data processing system. Doing so may cause computer implemented services desired by the requesting entity (e.g., that initiated the workload request) to be provided. Performance of the workload may complete servicing of the workload request.

The method may end following operation 308.

Turning to FIG. 4, a flow diagram illustrating a method of selecting a data processing system to perform a workload in accordance with an embodiment is shown. The method may be performed by a data processing system or another entity.

Prior to operation 400, a workload request may be distributed to data processing systems by one of the data processing systems (e.g., that received the workload request). Operations 400-406 may be performed by the data processing system that initially obtained the workload request, or by another data processing system.

At operation 400, a proposal regarding servicing of the workload request is generated. The proposal may be generated by estimating when the workload request may be serviced by a data processing system. The estimate may be generated via any method (e.g., using heuristic information, using trained model such as machine learning models, or via other methods).

The proposal may indicate a point in time when the data processing system will perform a workload to service the workload request.

At operation 402, the proposal is distributed to at least a portion of the data processing systems. The proposal may be distributed by multicasting the proposal to the portion of the data processing systems using one or more messages.

At operation 404, feedback regarding the proposal is received from the portion of the data processing systems. The feedback may indicate whether the proposal is agreed to or denied by the data processing systems.

The feedback may be received via one or more messages, or may be received by the lack of messages. For example, a message indicating acceptance may be received from another data processing system that accepts the proposal. In contrast, a message may not be received from other data processing systems that do not accept the proposal.

At operation 406, the proposals from other data processing systems (e.g., and the proposal) are evaluated to determine a winning proposal. The data processing system that proposed the winning proposal may be selected to service the workload request.

The proposals may be evaluated by, for example, ordering the points in time indicated by each of the proposals from earliest to latest. The proposal indicating the earliest point in time to service the workload may be selected as the winning proposal.

In an embodiment, the proposals are evaluated by ending the proposal process when a majority of the portion of data processing systems have indicated agreement to one of the proposals. For example, not all data processing systems may timely generate and distribute proposals. Rather, the proposals may be generated and distributed asynchronously. Rather than waiting for all of the proposals to be generated, data processing systems that receive proposals may compare their proposal to the received proposal. If the received proposal indicates and earlier point in time to service the workload than that proposed by the receiving data processing system, then the data processing system may indicate acceptance of the proposal by sending a corresponding message. If one of the data processing system receives messages corresponding to a majority of the cardinality of the portion of the data processing systems, then the proposal by that data processing system may be selected and the proposal process (e.g., operations 400-404 which may be asynchronously performed by any number of data processing systems) may terminate.

The method may end following operation 406.

Using the methods illustrated in FIGS. 3-4, embodiments disclosed herein may facilitate workload placement in a distributed environment in which data processing systems may become unavailable (e.g., unexpectedly). Thus, a distributed system in accordance with embodiments disclosed herein may be able to operating in more challenging environment that may render some data processing system unavailable while still completing requested workloads.

To further clarify embodiments disclosed herein, FIGS. 5A-5F show diagrams in accordance with an embodiment disclosed herein illustrating example operation of a system similar to that shown in FIG. 1A over time. In these figures, actions performed by various components are highlighted with numbered circular element and interactions between components (e.g., communications, data transport, etc.) are highlighted using arrows with dashed tails.

Figure 5A:
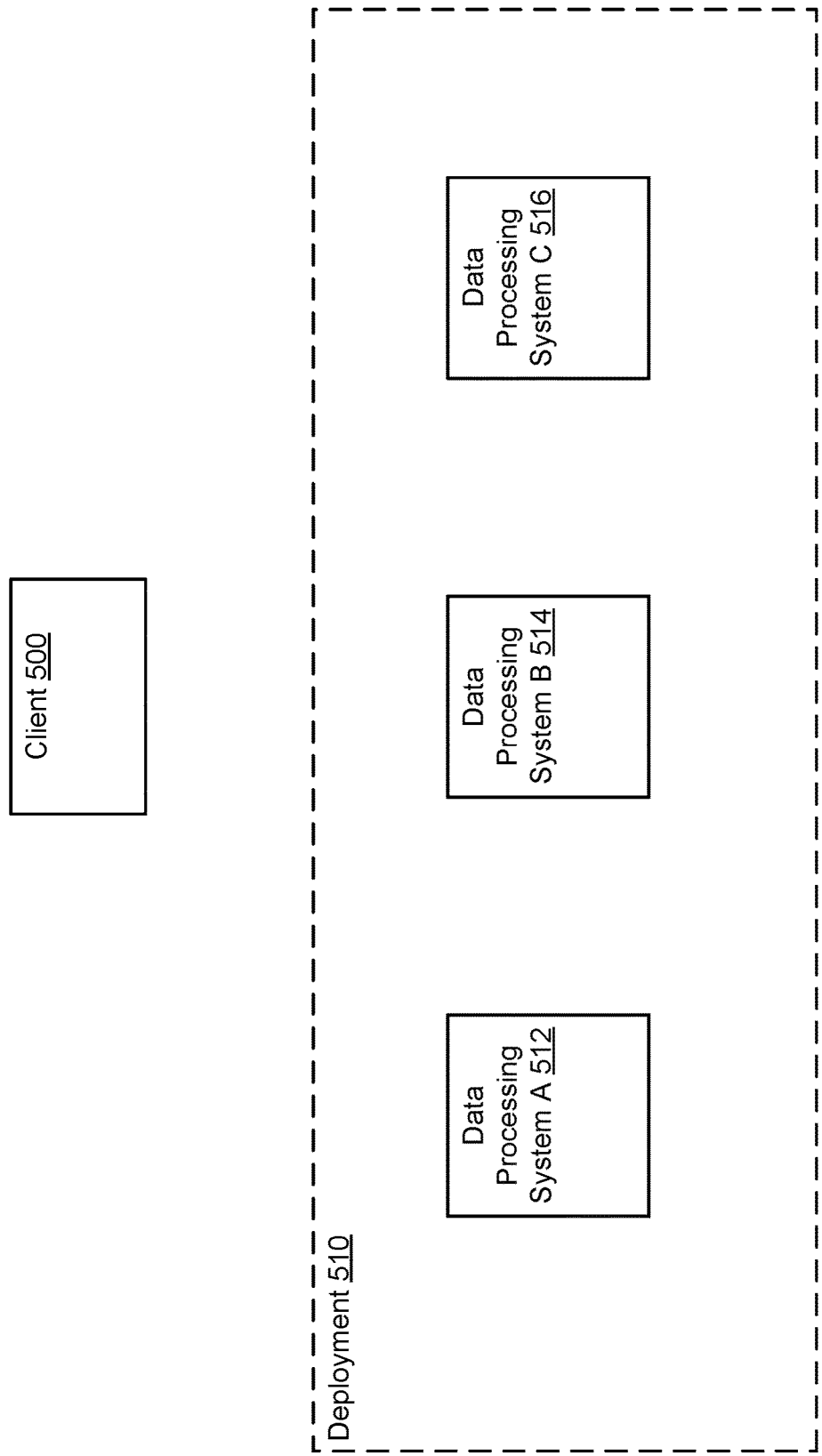

Turning to FIG. 5A, consider an example scenario where client 500 may desire to have deployment 510 perform workloads. Deployment 510 may include three data processing systems 512-516 that form a control plane.

Figure 5B:
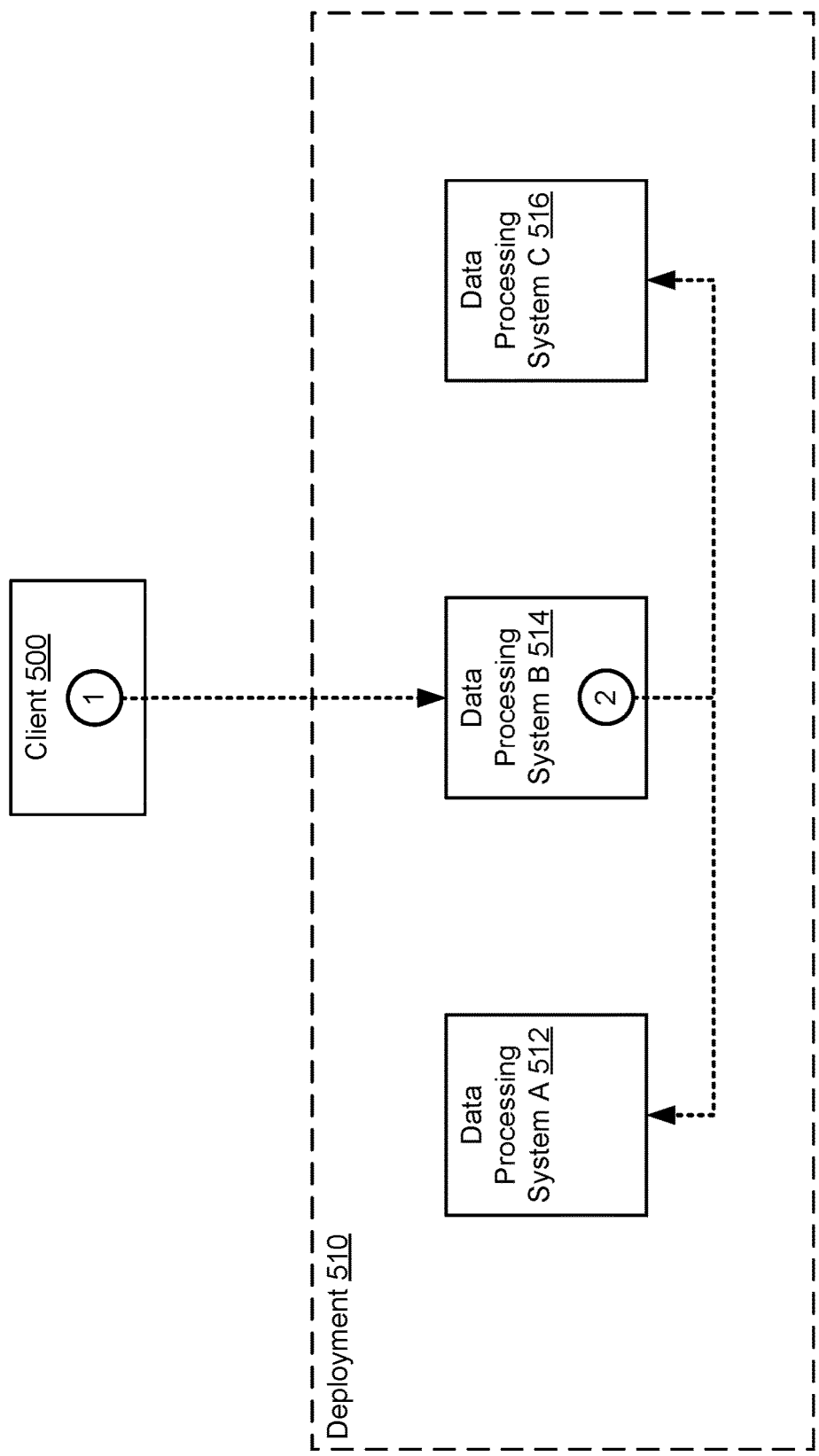
Figure 5C:
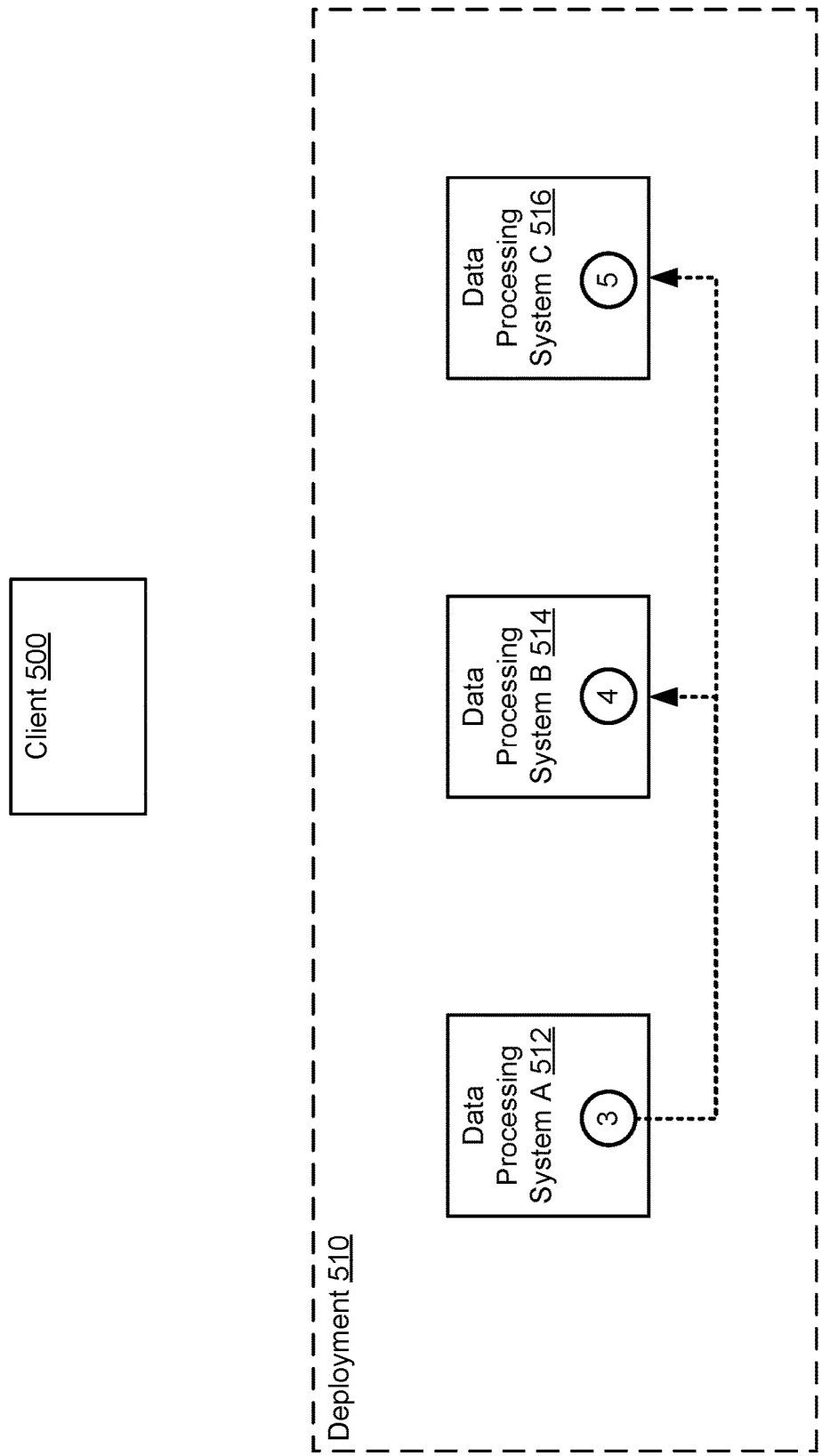

At a first point in time, as shown in FIG. 5B, client 500, at block 1, may send a request to data processing system B 514 for a database workload.

At block 2, data processing system B 514 distributes workload request information specifying the database workload to data processing systems A and C 512, 516.

At block 3, data processing system A 512 generated a first proposal indicating the data processing system A 512 will service the database workload at a first future point in time. Data processing system A 512 distributes the first proposal to data processing systems B and C 514 and 516.

At blocks 4 and 5, data processing systems B and C 514, 516 begin to evaluate the first proposal.

Turning to FIG. 5D, at block 6, data processing system C 516 determines that it may performing the database workload at a second future point in time that is earlier than the first future point in time. Consequently, data processing system C 516 does not respond to the first proposal, generates a second proposal indicating the second future time period, and distributes the second proposal to data processing systems A and B 512, 514.

At blocks 7 and 8, data processing systems A and B 512, 514 evaluate the second proposal. Based on the evaluation, both data processing systems A and B 512, 514 determine that they are unable to perform database workload prior to the second point in time.

Figure 5E:
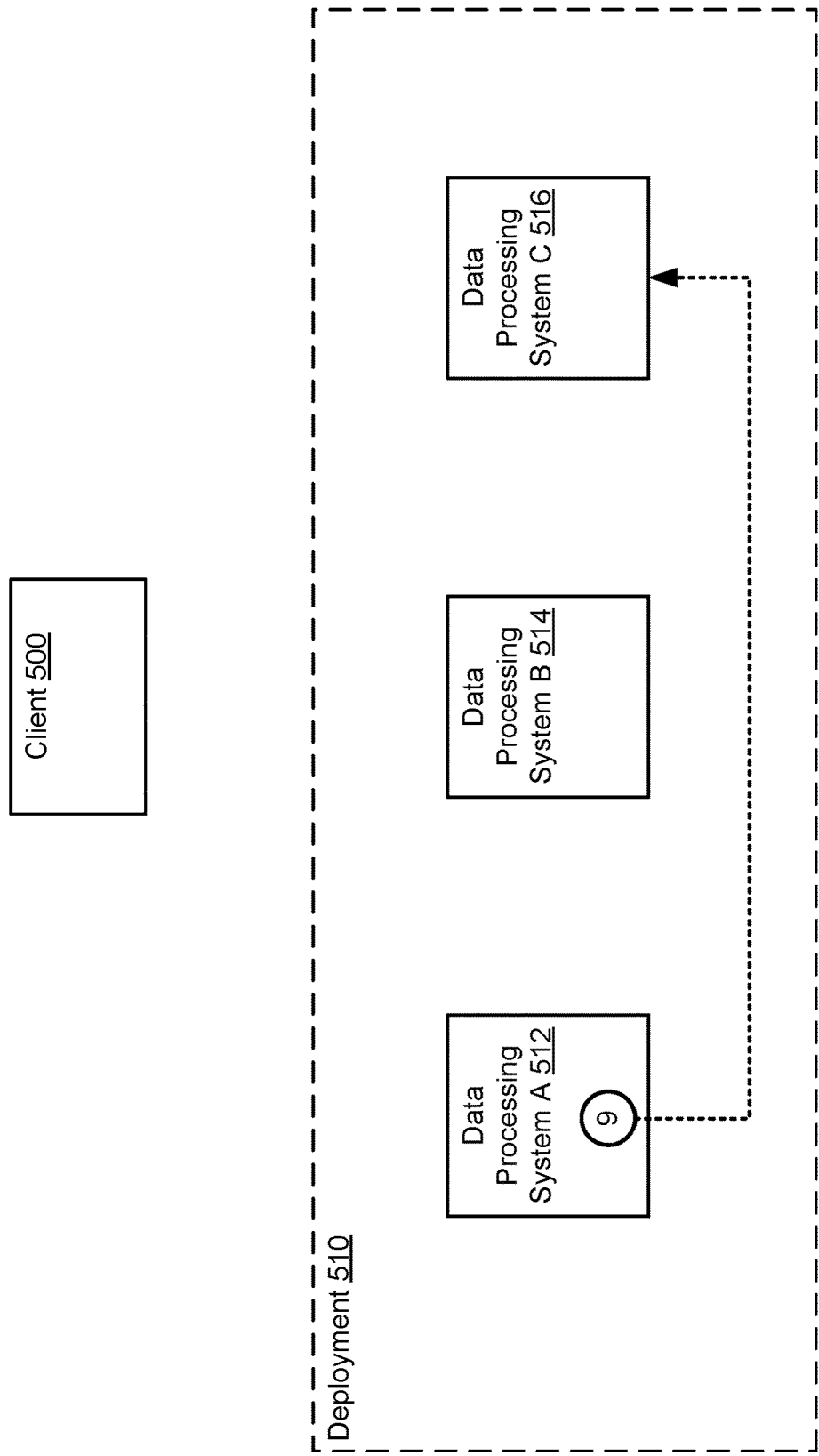

Turning to FIG. 5E, at block 9, data processing systems A generates and sends acceptances of the second proposal to data processing system C 516.

When data processing system C 516 receives the acceptance of the second proposal, the proposal process ends because a majority of the data processing systems (2 out of 3) have accepted the second proposal.

Consequently, turning to FIG. 5F, at block 9, data processing system C 516 proceeds to perform the database workload thereby generating the workload result 520 even though data processing system B 514 has not indicated acceptance of the second proposal (which may be due, for example, to data processing system B 514 failing, losing network connectivity, or for other reasons).

Client 500 and/or other entities may utilize workload result 520 to provide various services.

Thus, the system as shown in FIGS. 5A-5F may be capable of continued operation even in the event of unavailability of one or more of the data processing systems.

Figure 6:
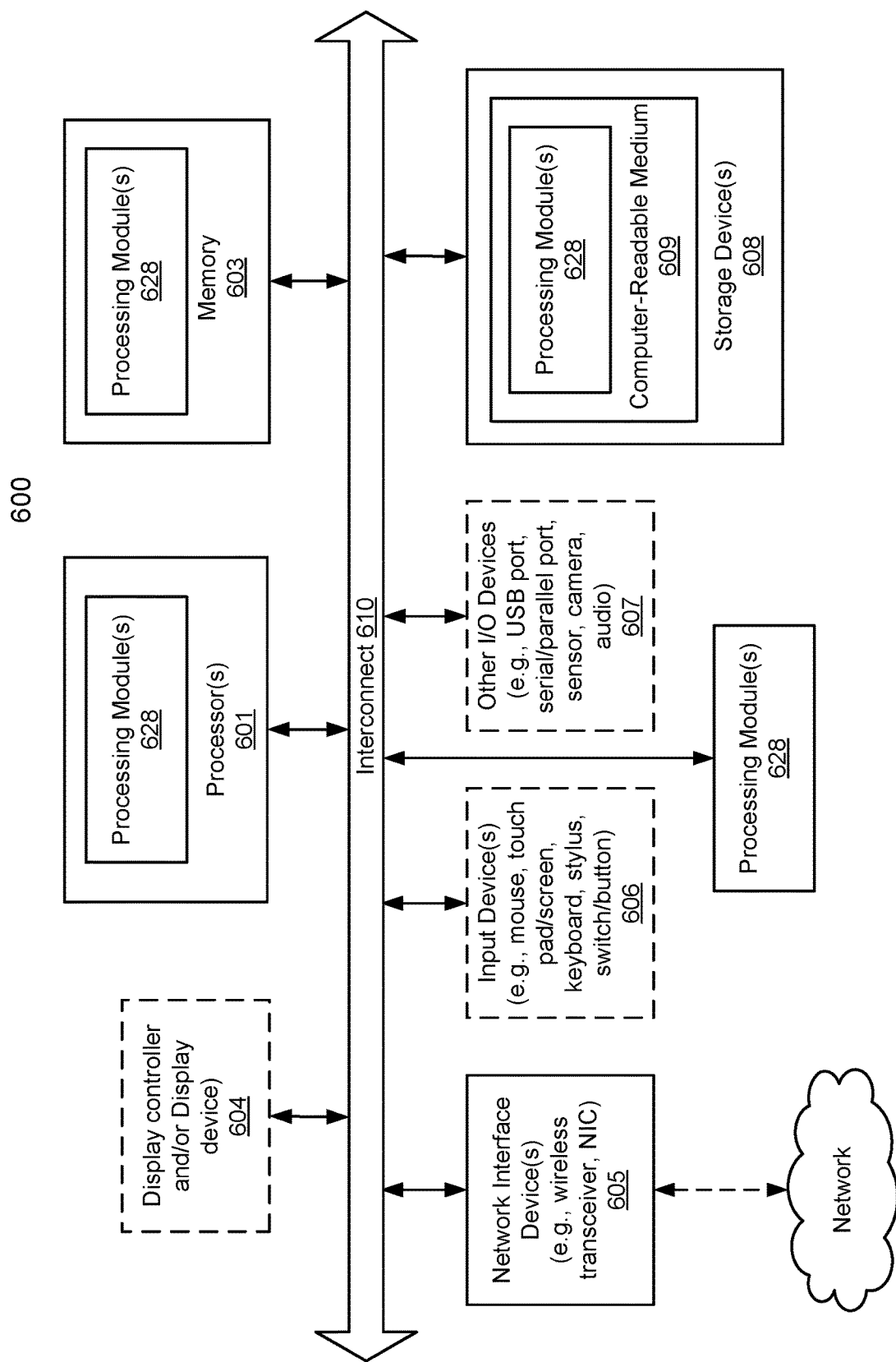
FIG. 6 shows a block diagram illustrating a data processing system in accordance with an embodiment.

Any of the components illustrated in FIGS. 1A-5F may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for servicing workload requests using a distributed system comprising data processing systems, the method comprising:
    obtaining, by a first data processing system of the data processing systems making up the distributed system, a workload request for a workload;
    distributing, by the first data processing system, workload request information to at least a portion of the data processing systems making up the distributed system, the workload request information being based on the workload request and the portion of the data processing systems that received the workload request information and the first data processing system make up a first group of the data processing systems making up the distributed system;
    initiating, by the first data processing system, a leaderless majority consensus based scheduling process where the data processing systems making up the first group use at least the workload request information to reach a leaderless majority consensus for one data processing system from the first group to service the workload request, a final result of the leaderless majority consensus being received and verified by only the one data processing system, and an entirety of the distributed system including the first group is leaderless before and after reaching the leaderless majority consensus where none of the data processing systems is ever elected and designated by any other ones of the data processing systems as being a leader, over the other data processing systems, that is able to control one or more operations of the distributed system and of the data processing systems; and
    servicing, by the first data processing system and after completion of the leaderless majority consensus based scheduling process, the workload request through the one data processing system, wherein the one data processing system schedules a future performance of the workload.

2. The computer-implemented method of claim 1, wherein the leaderless majority consensus based scheduling process comprises:
    generating, by a first data processing system of the first group, a proposal indicating that the first data processing system of the first group wants to service the workload request;
    distributing, by the first data processing system of the first group, the proposal to all other data processing systems within the first group; and
    receiving, by the first data processing system of the first group and as intermediate results of the leaderless majority consensus reached by the first group, feedback from each of the other data processing systems within the first group accepting or denying the proposal by the first data processing system of the first group to service the workload request, the intermediate results being combined by the first data processing system into the final results, and the first data processing system of the first group being the one data processing system from the first group to service the workload request if the first data processing system determines using the feedback from each of the other data processing system that a majority of the data processing systems within the first group accepts the proposal.

3. The computer-implemented method of claim 2, wherein
    the proposal indicates a performance time for the workload, the performance time indicating a point in time at which the first data processing system of the first group proposes to start servicing the workload request, and
    the feedback to the first data processing system of the first group comprises, from each of the other data processing systems within the first group:
    a message accepting the proposal, or
    a no response to the proposal indicating that the proposal is denied.

4. The computer-implemented method of claim 1, further comprising:
    performing, by the one data processing system from the first group, the workload based on the scheduled future performance.

5. The computer-implemented method of claim 1, wherein each of the data processing systems making up the distributed system operate as workload request servicing end points and workload request servicers.

6. The computer-implemented method of claim 5, wherein the portion of the data processing systems that received the workload request information comprises a majority of the data processing systems making up the distributed system.

7. The computer-implemented method of claim 6, wherein the one data processing system from the first group is selected when a majority of the data processing systems making up the first group determines that the one data processing system from the first group is capable of servicing the workload request more quickly than all other remaining data processing systems of the first group.

8. The computer-implemented method of claim 5, wherein the data processing systems making up the distributed system are distributed geographically from one another and with corresponding clients that may submit the workload requests.

9. The computer-implemented method of claim 1, wherein the leaderless majority consensus based scheduling process is independent of an availability status of each of the data processing systems making up the first group where remaining connected ones of the data processing systems making up the first group continue to perform and complete the leaderless majority consensus based scheduling process without being affected and interrupted by disconnection of any one of the data processing systems making up the first group from the distributed system while performance of a current one of the leaderless majority consensus based scheduling process by the first group is ongoing.

10. The computer-implemented method of claim 1, wherein the first data processing system distributes the workload request information by directly transmitting the workload request information to each data processing system making up the first group.

11. The computer-implemented method of claim 9, wherein the entirety of the distributed system including the first group being leaderless before and after reaching the leaderless majority consensus further requires that no data processing system among the data processing systems of the distributed system is able to actively control any other ones of the data processing systems of the distributed system.

12. A non-transitory machine-readable medium having instructions stored therein, which when executed by a processor, cause the processor to perform operations for servicing workload requests using a distributed system comprising data processing systems, the operations comprising:
  obtaining, by a first data processing system of the data processing systems making up the distributed system, a workload request for a workload;
  distributing, by the first data processing system, workload request information to at least a portion of the data processing systems making up the distributed system, the workload request information being based on the workload request and the portion of the data processing systems that received the workload request information and the first data processing system make up a first group of the data processing systems making up the distributed system;
  initiating, by the first data processing system, a leaderless majority consensus based scheduling process where the data processing systems making up the first group use at least the workload request information to reach a leaderless majority consensus for one data processing system from the first group to service the workload request, a final result of the leaderless majority consensus being received and verified by only the one data processing system, and an entirety of the distributed system including the first group is leaderless before and after reaching the leaderless majority consensus where none of the data processing systems is ever elected and designated by any other ones of the data processing systems as being a leader, over the other data processing systems, that is able to control one or more operations of the distributed system and of the data processing systems; and
  servicing, by the first data processing system and after completion of the leaderless majority consensus based scheduling process, the workload request through the one data processing system, wherein the one data processing system schedules a future performance of the workload.

13. The non-transitory machine-readable medium of claim 12, wherein the leaderless majority consensus based scheduling process comprises:
  generating, by a first data processing system of the first group, a proposal indicating that the first data processing system of the first group wants to service the workload request;
  distributing, by the first data processing system of the first group, the proposal to all other data processing systems within the first group; and
  receiving, by the first data processing system of the first group and as intermediate results of the leaderless majority consensus reached by the first group, feedback from each of the other data processing systems within the first group accepting or denying the proposal by the first data processing system of the first group to service the workload request, the intermediate results being combined by the first data processing system into the final results, and the first data processing system of the first group being the one data processing system from the first group to service the workload request if the first data processing system determines using the feedback from each of the other data processing system that a majority of the data processing systems within the first group accepts the proposal.

14. The non-transitory machine-readable medium of claim 13, wherein
  the proposal indicates a performance time for the workload, the performance time indicating a point in time at which the first data processing system of the first group proposes to start servicing the workload request, and
  the feedback to the first data processing system of the first group comprises, from each of the other data processing systems within the first group:
    a message accepting the proposal, or
    a no response to the proposal indicating that the proposal is denied.

15. The non-transitory machine-readable medium of claim 12, wherein the operations further comprise:
  performing, by the one data processing system from the first group, the workload based on the scheduled future performance.

16. The non-transitory machine-readable medium of claim 12, wherein each of the data processing systems making up the distributed system operate as workload request servicing end points and workload request servicers.

17. A data processing system, comprising:
  a processor; and
  a memory coupled to the processor to store instructions, which when executed by the processor, cause the processor to perform operations for servicing workload requests using a distributed system comprising data processing systems, the data processing system being one of the data processing systems making up the distributed system and the operations comprising:
    obtaining, by a first data processing system of the data processing systems making up the distributed system, a workload request for a workload;
    distributing workload request information to at least a portion of the data processing systems making up the distributed system, the workload request information being based on the workload request and the portion of the data processing systems that received the workload request information and the first data processing system make up a first group of the data processing systems making up the distributed system;
    initiating, by the first data processing system, a leaderless majority consensus based scheduling process where the data processing systems making up the first group use at least the workload request information to reach a leaderless majority consensus for one data processing system from the first group to service the workload request, a final result of the leaderless majority consensus being received and verified by only the one data processing system, and an entirety of the distributed system including the first group is leaderless before and after reaching the leaderless majority consensus where none of the data processing systems is ever elected and designated by any other ones of the data processing systems as being a leader, over the other data processing systems, that is able to control one or more operations of the distributed system and of the data processing systems; and servicing, after completion of the leaderless majority consensus based scheduling process, the workload request through the one data processing system, wherein the one data processing system schedules a future performance of the workload.

18. The data processing system of claim 17, wherein the leaderless majority consensus based scheduling process comprises:

generating, by a first data processing system of the first group, a proposal indicating that the first data processing system of the first group wants to service the workload request;

distributing, by the first data processing system of the first group, the proposal to all other data processing systems within the first group; and receiving, by the first data processing system of the first group and as intermediate results of the leaderless majority consensus reached by the first group, feedback from each of the other data processing systems within the first group accepting or denying the proposal by the first data processing system of the first group to service the workload request, the intermediate results being combined by the first data processing system into the final results, and the first data processing system of the first group being the one data processing system from the first group to service the workload request if the first data processing system determines using the feedback from each of the other data processing system that a majority of the data processing systems within the first group accepts the proposal.

19. The data processing system of claim 18, wherein the proposal indicates a performance time for the workload, the performance time indicating a point in time at which the first data processing system of the first group proposes to start servicing the workload request, and the feedback to the first data processing system of the first group comprises, from each of the other data processing systems within the first group:

a message accepting the proposal, or a no response to the proposal indicating that the proposal is denied.

20. The data processing system of claim 17, wherein each of the data processing systems making up the distributed system operate as workload request servicing end points and workload request servicers.

* * * * *